United States Patent
Epstein et al.

(10) Patent No.: US 11,051,053 B2
(45) Date of Patent: *Jun. 29, 2021

(54) CLOUD DVR OPTIMIZATION

(71) Applicant: Synamedia Limited, Middlesex (GB)

(72) Inventors: Steve Epstein, Hashmonaim (IL); Orly Ovadia-Amsalem, Jerusalem (IL); David S. Morgan, Apex, NC (US)

(73) Assignee: SYNAMEDIA LIMITED, Middlesex (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/513,252

(22) Filed: Jul. 16, 2019

(65) Prior Publication Data
US 2019/0342589 A1    Nov. 7, 2019

Related U.S. Application Data

(63) Continuation of application No. 15/814,423, filed on Nov. 16, 2017, now Pat. No. 10,405,012.
(Continued)

(51) Int. Cl.
*H04N 21/433* (2011.01)
*H04N 21/231* (2011.01)
(Continued)

(52) U.S. Cl.
CPC ....... *H04N 21/23113* (2013.01); *G06F 16/43* (2019.01); *H04N 21/2393* (2013.01);
(Continued)

(58) Field of Classification Search
None
See application file for complete search history.

(56) References Cited

U.S. PATENT DOCUMENTS

2002/0123928 A1*  9/2002  Eldering ............ G06Q 30/0255
                                                       705/14.52
2012/0210385 A1   8/2012  Walker et al.
(Continued)

OTHER PUBLICATIONS

Liu, C.; "ADMAD: Application-Driven Metadata Aware Deduplication Archival Storage System," 2008 Fifth IEEE International Workshop on Storage Network Architecture and Parallel I/Os, Baltimore, MD, 23008, pp. 29-35.

*Primary Examiner* — Cai Y Chen
(74) *Attorney, Agent, or Firm* — Merchant & Gould P.C.

(57) ABSTRACT

In one embodiment, a method, system and apparatus are described for cloud digital video recorder optimization. A cloud based storage unit stores recorded content items in response to recording requests by users from among a plurality of users, each recorded content item belonging to at least one content item type category and each user belonging to at least one user type category. A processor receives log files tracking the recording requests, applies a data-driven procedure to the log files on a basis of at least one of: the at least one content item type category and the at least one user type category, and assigns each recorded content item to a group associated with a second plurality of users and a co-related group of content items of a given content item type category and determines times to delete each recorded content item from the cloud based storage unit. Related methods, systems, and apparatus are also described.

20 Claims, 8 Drawing Sheets

Related U.S. Application Data

(60) Provisional application No. 62/439,039, filed on Dec. 25, 2016.

(51) Int. Cl.

| | | |
|---|---|---|
| *H04N 21/239* | (2011.01) | |
| *H04N 21/258* | (2011.01) | |
| *G06F 16/43* | (2019.01) | |
| *H04N 21/2747* | (2011.01) | |
| *H04N 21/25* | (2011.01) | |
| *H04N 21/2668* | (2011.01) | |
| *H04N 21/472* | (2011.01) | |
| *H04N 21/439* | (2011.01) | |
| *G06F 16/40* | (2019.01) | |
| *G06F 16/951* | (2019.01) | |

(52) U.S. Cl.
CPC ..... *H04N 21/23116* (2013.01); *H04N 21/252* (2013.01); *H04N 21/258* (2013.01); *H04N 21/25891* (2013.01); *H04N 21/2668* (2013.01); *H04N 21/2747* (2013.01); *H04N 21/4334* (2013.01); *H04N 21/47217* (2013.01); *G06F 16/40* (2019.01); *G06F 16/951* (2019.01); *H04N 21/4394* (2013.01)

(56) References Cited

U.S. PATENT DOCUMENTS

| | | | |
|---|---|---|---|
| 2014/0282762 A1* | 9/2014 | Bjordammen | H04N 21/4667 725/92 |
| 2015/0189343 A1* | 7/2015 | Lee | H04N 21/8456 725/1 |
| 2015/0227436 A1 | 8/2015 | Wilson et al. | |
| 2015/0244972 A1 | 8/2015 | Pulido et al. | |
| 2015/0309880 A1 | 10/2015 | Barajas Gonzalez et al. | |
| 2015/0324379 A1* | 11/2015 | Danovitz | G06F 16/951 707/825 |
| 2016/0080815 A1 | 3/2016 | Ruffini | |
| 2016/0092781 A1* | 3/2016 | Byrnes | G06Q 30/0631 706/52 |
| 2016/0112735 A1* | 4/2016 | Stephens, Jr. | H04N 21/466 725/14 |
| 2017/0102890 A1 | 4/2017 | Vittal Viveganandhan et al. | |
| 2017/0105028 A1 | 4/2017 | Ricker et al. | |
| 2017/0366847 A1* | 12/2017 | Covell | G11B 27/28 |

* cited by examiner

CLOUD DVR OPTIMIZATION

RELATED APPLICATION INFORMATION

The present application is a continuation of U.S. patent application Ser. No. 15/814,423, filed on Nov. 16, 2017, which claims the benefit of U.S. Provisional Application No. 62/439,039, filed Dec. 25, 2016, under provisions of 35 U.S.C. § 119(e), each of which is incorporated by reference herein for all purposes.

TECHNICAL FIELD

The present disclosure generally relates to cloud digital video recorder (cDVRs).

BACKGROUND

Digital video recorders (DVRs) are electronic devices which record video in a digital format to a digital storage device, such as, but not limited to a flash drive, a memory card, a solid state drive, a hard disk drive, or other storage devices as are known in the art. Some DVRs record video to a networked storage device, which may be referred to sometimes as "cloud storage". Cloud DVRs, or, cDVRs, typically store the video in logical pools, where the physical storage may span multiple cloud storage devices.

As a result of various court decisions and other legal constraints imposed by various regulatory agencies in the U.S.A. and various other jurisdictions, one copy of a recorded content item per recording user needs to be maintained by a service provider in a cloud storage environment. For example, if one thousand users all record a television program broadcast at one particular time, then the service provider would need to store one thousand copies of the recorded television program in cloud storage.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

In one embodiment, a method, system and apparatus are described for cloud digital video recorder optimization. A cloud based storage unit stores recorded content items in response to recording requests by users from among a plurality of users, each recorded content item belonging to at least one content item type category and each user belonging to at least one user type category. A processor receives log files tracking the recording requests, applies a data-driven procedure to the log files on a basis of at least one of: the at least one content item type category and the at least one user type category, and assigns each recorded content item to a group associated with a second plurality of users and a co-related group of content items of a given content item type category and determines times to delete each recorded content item from the cloud based storage unit. Related methods, systems, and apparatus are also described.

EXEMPLARY EMBODIMENT

Figure 1:
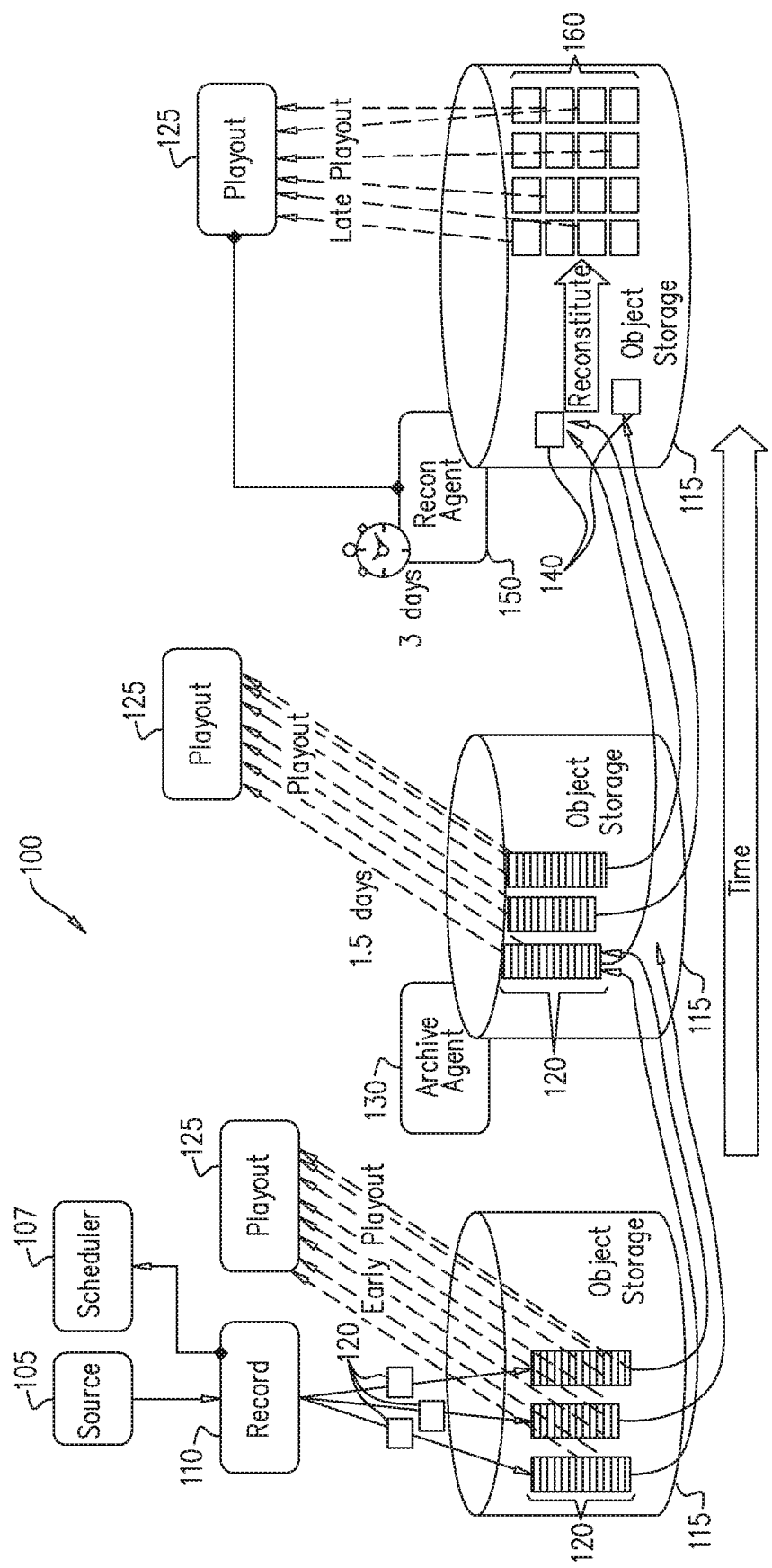
FIG. 1 is a simplified block diagram illustration of a first embodiment of a system for cloud DVR storage and reconstitution, constructed and operative in accordance with an embodiment of the present invention.

Reference is now made to FIG. 1, which is a simplified block diagram illustration of a first embodiment 100 of a system for cloud DVR storage and reconstitution, constructed and operative in accordance with an embodiment of the present invention. FIG. 1 depicts a video source 105 which provides a video which is recorded by a recorder 110. A scheduler 107 provides a catalog of video content items which are available at any given time for the recorder 110 to record from the video source 105. The recorder 110 stores copies of a recording in a storage device 115. The storage device 115 may be implemented a distributed cloud storage device 115 comprising a plurality of physical storage media which is distributed across multiple server farms, as is known in the art. As users play the stored recorded content item 120, the stored recorded items are sent to a playout system 125, which provides delivery of a single copy of the stored recorded content item 120 to one of the users which is playing out the stored recorded content item 120.

As noted above, in the U.S.A. and other jurisdictions, one copy of a recorded content item 120 per recording user needs to be maintained by a service provider in a cloud storage environment. Accordingly, the recorder 110 makes a single copy which in turn is copied to multiple copies which are stored for each user. In some embodiments, the system may be configured to provide unique storage of recorded content item for each user for a given time period, such as three days. That is to say, for the first three days after the recorded content item is acquired, each copy of the recorded content item 120 is stored uniquely for each user that requested a recording of that content item. After three days, however, all copies are deleted from the storage device 115, except a small number of archived copies. Archive copies are prepared and maintained by an archive agent 130. Should a copy be required for an individual user after three days, then one of the of the archive copies 140 of the recorded content item 120 prepared and maintained by the archive agent 130 is retrieved by a reconstitution agent 150. The reconstitution agent 150 prepares a reconstituted copy of the recorded content item 120, which will then be played out by the playout system 125 for the requesting user.

It is appreciated that the three day period mentioned above is by way of example only, and some embodiments of system 100 may use a two day period, a four day period, or other appropriate time period. However, in terms of computer processing using and storage usage, the above described embodiment is costly. Accordingly, a balance is typically struck between the amount of time copies of the recorded content item 120 are maintained on the storage device 115 versus the cost (in terms of processing and storage) of creating new copies, such as copies 160, upon demand.

Figure 2:
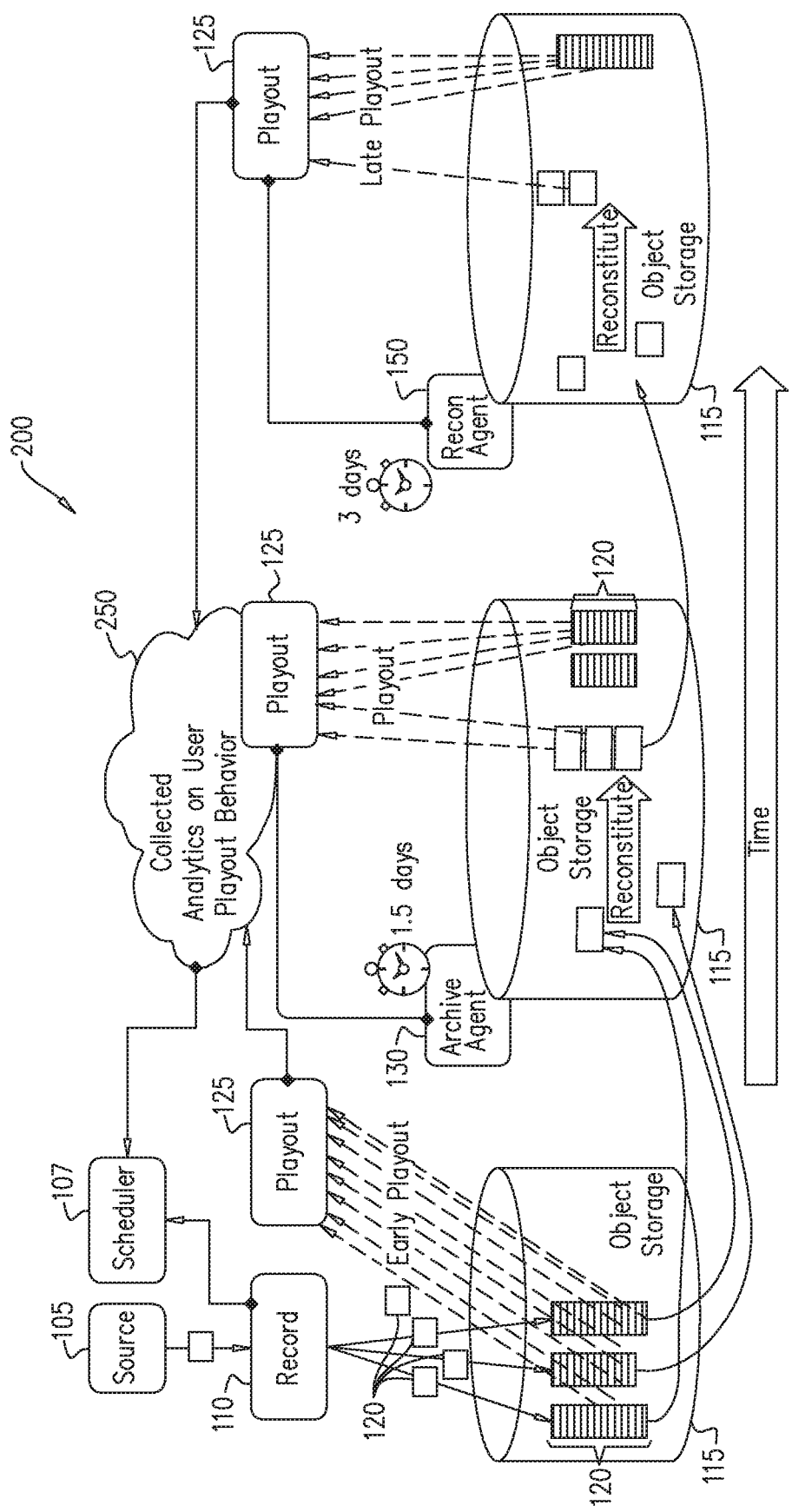
FIG. 2 is a simplified block diagram illustration of a second embodiment of a system for cloud DVR storage and reconstitution, constructed and operative in accordance with an embodiment of the present invention.

Reference is now made to FIG. 2, which is a simplified block diagram illustration of a second embodiment 200 of a system for cloud DVR storage and reconstitution, constructed and operative in accordance with an embodiment of the present invention. Since some users typically playback specific types of recorded content item earlier and other users will playback that type of recorded content item later, improvement of the embodiment depicted in FIG. 1 is desirable. An analytics system 250 collects and analyzes user playout behavior using a data-driven procedure, as described below, in order to inspect past behavior and, as explained below, predict the latest playback time per user per recorded content item 120. Using the analytics system 250 enables saving both storage costs of the users who are early 'playbackers' (i.e. who play back the recorded content item 120 before 3 days) and reconstitution costs on users who are late 'playbackers' (i.e. who play back the recorded content item 120 after 3 days).

Over time, copies of the recorded content item 120 of early 'playbackers' are deleted once the predicted last playback time has elapsed, while other copies are maintained over time for late 'playbackers'. Copies are reconstituted on the storage device 115 for users who deviate from their predicted behavior, and playback content past expected times for that type of recorded content item.

Figure 3:
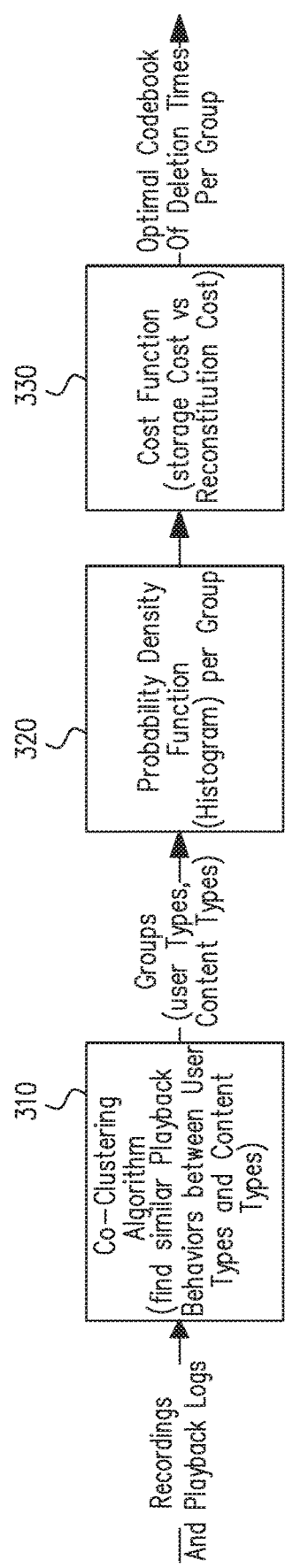
FIG. 3 is a partly flowchart and partly block diagram depicting a method for building a model for the cloud DVR optimization system of FIG. 2.

Reference is now made to FIG. 3, which is a flowchart diagram depicting a method for building a model for the cloud DVR optimization system of FIG. 2. In a first stage, logs of recordings and playbacks are analyzed by a co-clustering algorithm (step 310), which uses predictive analytics to find clusters of user types and content types with similar playback behaviors, i.e. groups. The groups which have been found are then used to draw a probability density function per user type and content type which is expected to be sparse as a result of anticipated similar behavior (step 320, explained in detail below). The probability density function is then input, on a per group basis, into a cost function to determine the optimal deletion time per user per content item (step 330, explained in detail below).

It is appreciated that the use of the term "cost" (in all of its various grammatical forms) is to be understood in the present disclosure and claims refer to a unitless number assigned to a measure of the relative desirability of a one option as opposed to another from the standpoint of computing and networking efficiency in the system described herein. The term "value" will be used as a synonym of "cost" herein in both the present disclosure and claims.

It is assumed herein that there is no one type of uniform playback behavior across all users across and all content items. Thus, data-driven procedures are applied to discover groups of user that show similar behaviors with respect to certain content items types, and then optimize a cost-function to optimize the deletion time per each mutual group of users and content items.

Turning now specifically to step 310, a similarity metric, S, is defined based on known features for users and content items, such as demographics, genres, etc. Similarity S, a value between 0-1, measures how any two entities in question are related, where 0 indicates no similarity and 1 indicates complete similarity. Based on the similarity metric S, associations are defined between users and content items. Specifically, the following similarities are measured using the input logs:

$S_{u,u}$ similarity of playback behavior between two users;
$S_{u,c}$ similarity of playback behavior between a user and a content item; and
$S_{c,c}$ similarity playback behavior between two content items.

Note that a distance metric is defined as 1-S.

By way of further amplification regarding the similarity metric, S, consider a hypothetical user. The hypothetical user has features that describe her, such as age, gender, genres of recorded content she likes to watch. Similarly, a recorded content item may also be described by these same features:

Age: an average or median age of the population watching the recorded content item;
Gender: which gender is most likely to watch the recorded content item; and
Genre: a genre of the recorded content item.

The metric S quantifies a correlation between the features between of the user and the recorded content item. One exemplary way of determining the metric S would be to use the Jaccard index, a statistic known in the art used for comparing the similarity and diversity of sample sets. For example, for a User U and a Content item C:

User U genres: {comedy, romance, lifestyle}
Content item C genres: {comedy, drama}

Accordingly, the similarity metric Su,c for User U and Content item C in this case would be 0.25, since only one genre (comedy) out of four overall genres (comedy, romance, lifestyle, and drama) is shared. It is appreciated that there are many other ways known in the art of determining the metric S besides the Jaccard index, which is mentioned above by example only.

A machine learning model that indicates related groups of user and recorded content is created. That is to say, users and recorded content that are in the same group resulting from creating the machine learning model share similar playback behavior. Co-Clustering, which is an unsupervised machine learning method, is utilized as a method for finding these groups. Alternatively, statistical methods are utilized for performing data analysis, for example, an average last playback time of recorded content types (e.g., news, sports, movies, etc.) and user types (e.g., male, female, youth, elderly, etc.) may be used to estimate when to delete different recorded content types for different user types. Other methods may be used in other embodiments for achieving the goal of finding related groups of user and recorded content.

A matrix M is constructed correlating users and recorded content, where each row in the matrix represents a single user, and each column represents a single recorded content. $S_{u,c}(u,c)$ is pre-computed by constructing matrix M, and indicates the similarity between all known users and recorded content. The matrix M is populated with the similarities, so that: $M_{i,j}=S_{u,c}(u_i,c_j)$. That is to say, each cell in the matrix is indicative of the similarity between the corresponding user and recorded content.

A spectral co-clustering method is performed on matrix M in order to discover users' groups and their association to certain recorded content groups. Those of skill in the art will appreciate that co-clustering is a method for clustering data based on rows and columns (as opposed to only rows). Accordingly, given a table of data, such as, for example, matrix M, where each row represents a case in the data (a user for example), and each column represents a feature of the row (in this case a specific recorded content the user may or may not watched) may be co-clustered. Co-clustering is method for finding groups of users together with recorded content items that are highly related. That is to say, each cluster will consist of entities from two types: recorded content items and users. In spectral co-clustering, the eigenvalues of matrix M are utilized using techniques known in the art in order to perform the co-clustering.

Figure 4:
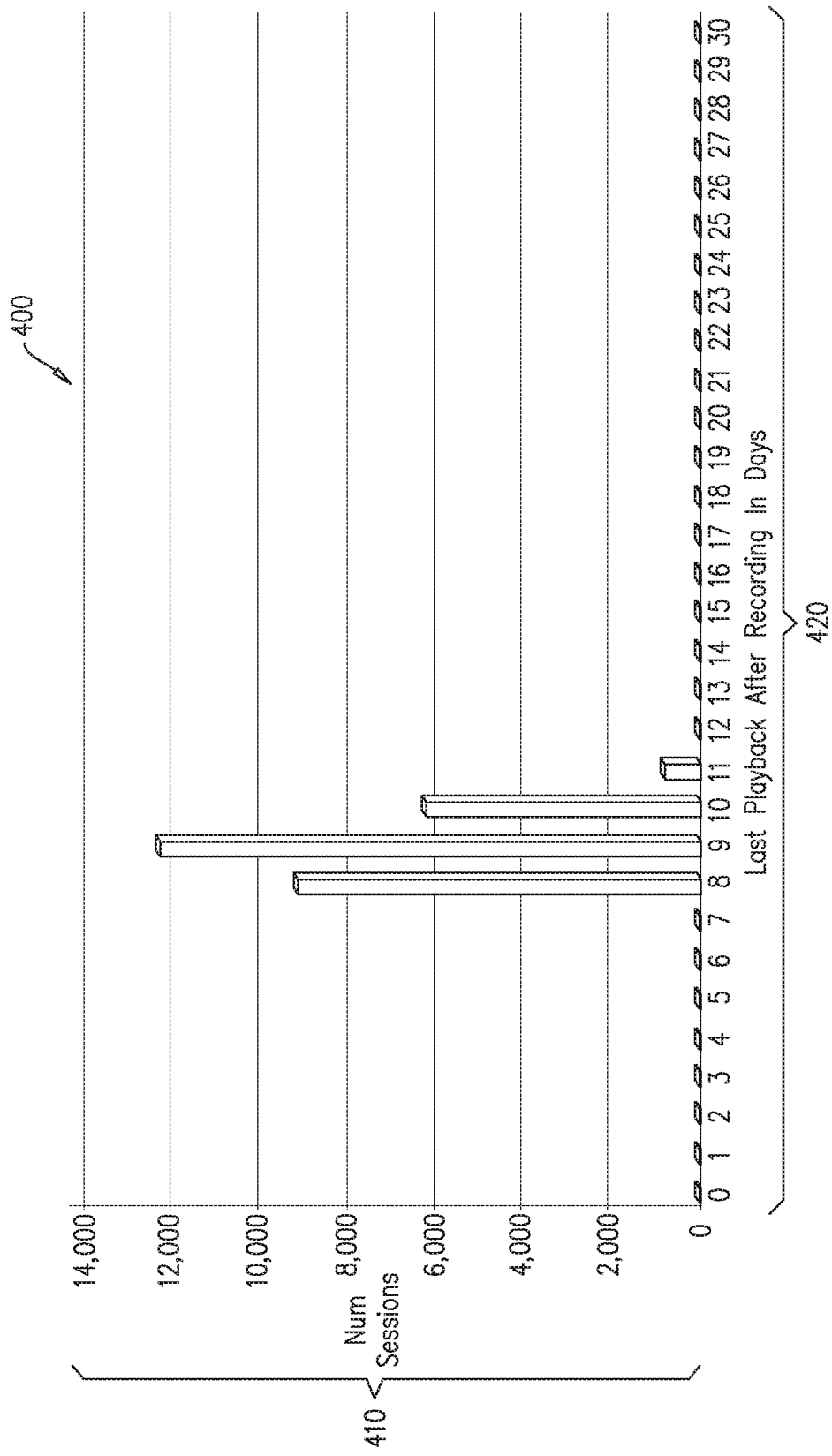
FIG. 4 is an exemplary probability density function histogram, illustrative of one step of FIG. 3.

Turing now to step 320, the probability density function per user type and recorded content type is determined. Reference is now additionally made to FIG. 4, which is an exemplary probability density function histogram 400, illustrative of step 320 in FIG. 3. The histogram 400 representing the probability density function (PDF) is created, the histogram 400 being a histogram of Number of Sessions 410 per Last Playback Time (in Days) 420 for each group of user type/recorded content type defined by the co-cluster method of step 310 above. Typically, user behavior exhibits certain patterns, users with similar behavioral patterns can be grouped together. As a result of this, it is expected that most of the elements in matrix M will be zero, and accordingly, the histogram 400 is expected to be sparse. Accordingly, the histogram 400 indicates playback behavior for a given type of user on a given type of recorded content.

Returning to the discussion of FIG. 3, at step 330, the storage cost and the reconstitution cost in a specific environment is input, where cost is a function of a particular environment which may comprise the storage device 115, particularly where the storage device 115 comprises a distributed cloud storage device 115, as discussed above. For example, and without limiting the generality of the foregoing, the storage device 115 may comprise an Amazon Web Service cloud storage device 115, or other comparable cloud storage device, as is known in the art.

A deletion date that minimizes total cost when applying the PDF distributions as displayed by the histogram 400 is determined by analyzing the histogram 400 in view of the input of the storage cost and the reconstitution cost. Total cost is typically considered by comparing the cost of storage versus the cost of reconstitution per Terabyte of data. The cost function enables determining an optimal duration in days upon which to delete the recorded content item per user type per recorded content type. Performing this determination for each output histogram (from step 320) results in a CodeBook (step 330) such as the exemplary CodeBook shown in the following table:

| CodeBook | User Type 1 | User Type N |
| --- | --- | --- |
| Content Type 1 | Optimal Deletion Time for Content Type 1 × User Type 1 | Optimal Deletion Time for Content Type 1 × User Type N |
| Content Type M | Optimal Deletion Time for Content Type M × User Type 1 | Optimal Deletion Time for Content Type M × User Type N |

Where, for example, Content Type 1 taken together with User Type 1 results in an optimal deletion time, indicated in the CodeBook table above as Optimal Deletion Time 11. Similarly, Content Type M taken together with User Type N results in an optimal deletion time, indicated in the CodeBook table above as Optimal Deletion Time MN.

Figure 5:
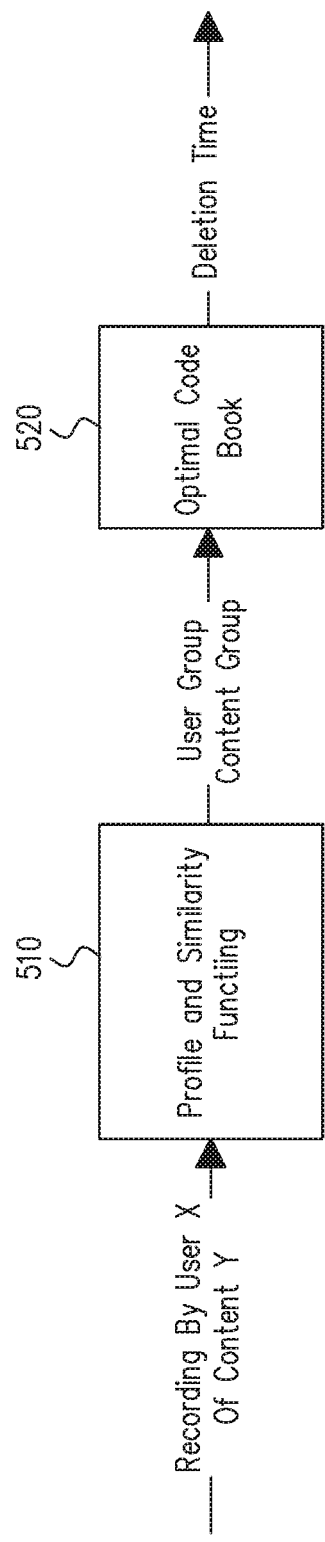
FIG. 5 is a partly flowchart and partly block diagram depicting a method for using a CodeBook output by the method of FIG. 3 to predict an optimal deletion time for a recording for a new user.

Reference is now made to FIG. 5, which is a flowchart diagram depicting a method for using the CodeBook output by the method of FIG. 3 to predict an optimal deletion time for a recording for a new user. After performing step 330 and producing the CodeBook, the CodeBook is then used to predict an Optimal Deletion Time per recording of each new user. At a first stage, in step 510, the new user and newly recorded content items are assigned to a specific user type and recorded content type, as will be explained below. At a second stage, the CodeBook is applied in order to look up an optimal deletion date for the assigned user type and the assigned recorded content type (step 520, explained below).

Turning specifically to step 510, given a user u and a recorded content item c, the following four cases are to dealt with:

$u_{new}$, $c_{new}$: History is not known for either the user u or the recorded content item c, meaning that neither the user u nor the recorded content item c participated in the construction of similarities matrix M. This case is dealt with below, in order to determine which histogram is most relevant for the new user and new recorded content item.

$u_{new}$, $c_{known}$: The user u is new in the system, and the recorded content item c is known to the system. Specifically, the recorded content item c was used in the construction of similarities matrix M, and the user u was not.

$u_{known}$, $c_{new}$: The user u in known in the system, but the recorded content item c is new. Specifically, the user u was used in the construction of similarities matrix M, and the recorded content item c was not.

$u_{known}$, $c_{known}$: History is known for both user and recorded content item. Specifically, both the recorded content item c and the user u were used in the construction of similarities matrix M.

Applying the similarity metric, S of step 310, the user u and the recorded content item c are then assigned to the most appropriate co-cluster in the following manner:

1. Compute an average distance between all of the users, $u_i$, and the recorded content items, $c_j$, per co-cluster.
2. The pair (u,c) is provisionally assigned to each one of the co-clusters, and then the average distance within each co-cluster is re-calculated. The pair (u,c) will be assigned to the co-cluster which has the smallest change in the average distance within each co-cluster before and after the assignment of the pair (u,c). It is presumed that the co-cluster to which the pair (u,c) is assigned is the co-cluster to which the pair is most similar.

In step 520, the deletion time is determined for recorded content item c recorded by user u based on the cost-function that was optimized for the co-cluster histogram to which this user-recorded content pair is assigned.

Figure 6:
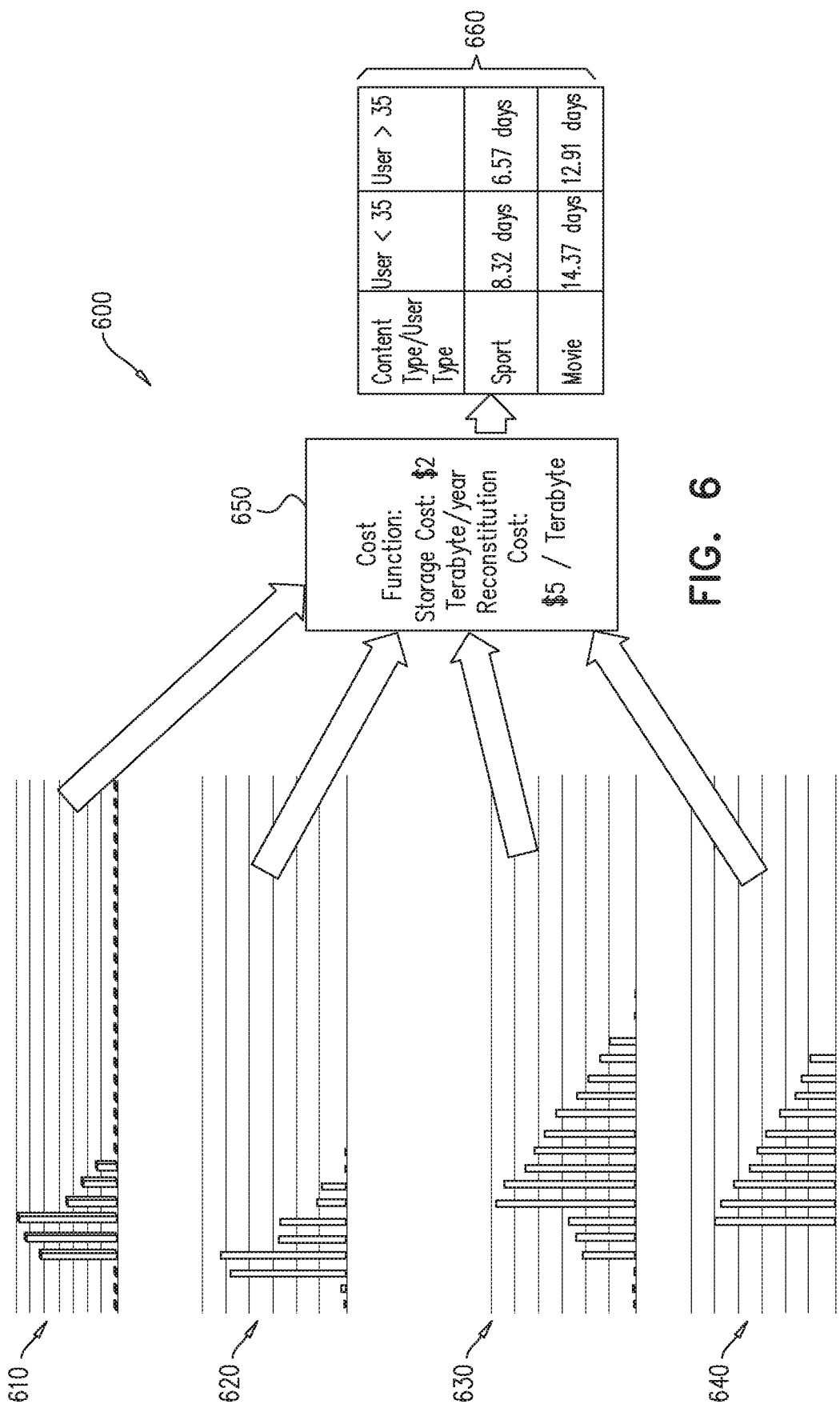
FIG. 6 is a depiction of an exemplary use of an embodiment of one method described herein.

Reference is now made to FIG. 6, which is a depiction of an exemplary use of an embodiment of the method described herein. FIG. 6 depicts a simplified model 600 where one co-clustering method described herein is applied to a dataset of users and recorded content items. An exemplary dataset in FIG. 6 is depicted as comprising two groups of users (above and below 35 years old) and two groups of recorded content (sports and movies), when the dataset is inspected across all recordings and playback times of all users across all recorded content.

The applying the above-mentioned dataset (i.e. two types of recorded content; and two types of users) results in four different histogram types:

Histogram 610: Distribution of last playback of users under age 35 upon recording recorded content relevant to the sports group;

Histogram 620: Distribution of last playback of users above age 35 upon recording recorded content relevant to the sports group;

Histogram 630: Distribution of last playback of users under age 35 upon recording recorded content relevant to the movie group; and Histogram 640: Distribution of last playback of users above age 35 upon recording recorded content relevant to the movie group.

Inputting the four distributions of histograms 610-640 as input into a cost function 650 describing the cost of storage versus the cost of reconstitution per Terabyte of data yields a deletion date that optimizes total cost. The cost function 650 outputs a matrix 660 of optimal duration in days upon which to delete the recorded content per user type per recorded content type.

It is appreciated that the costs depicted in the cost function 650 of $2 TB/year for storage and $5/TB for reconstitution are by way of example. Other embodiments may utilize other parameters in the cost function 650.

Figure 7:
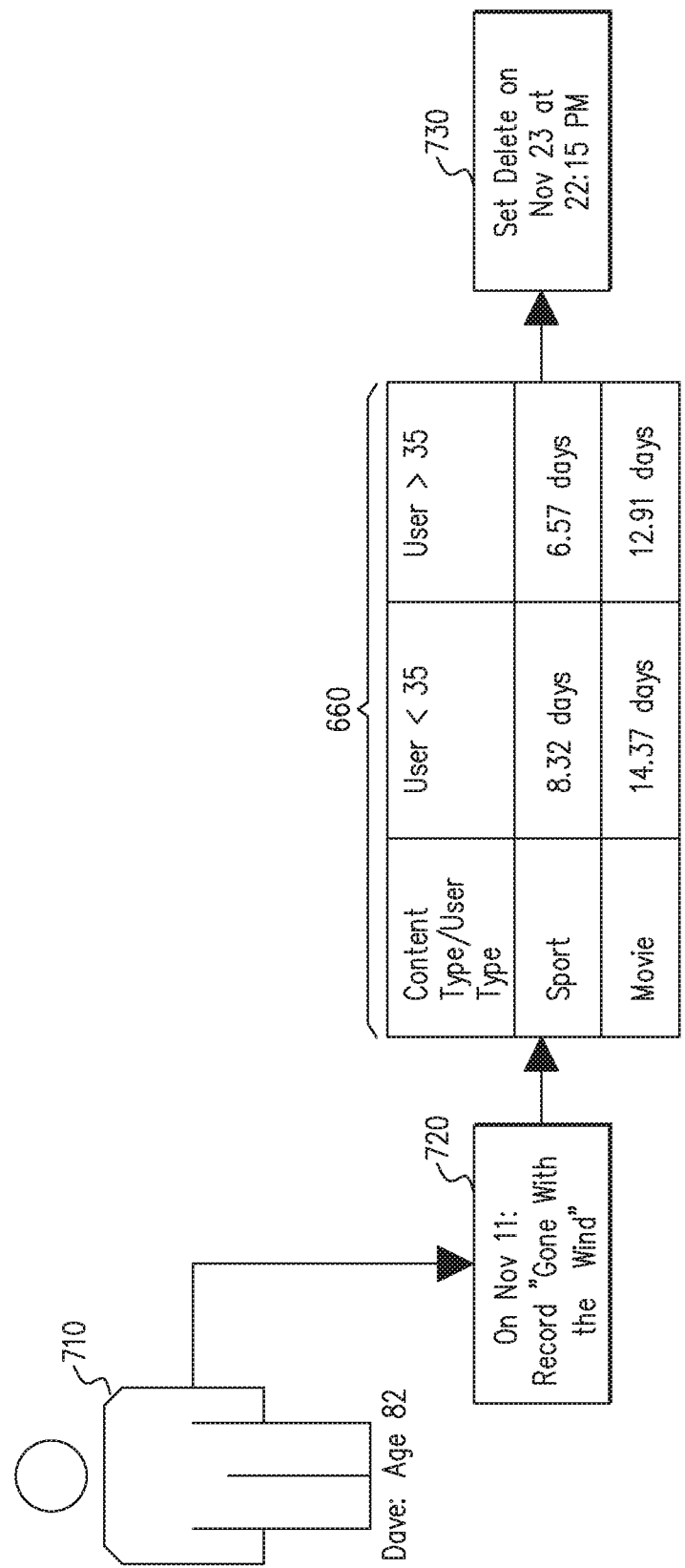
FIG. 7 is a depiction of using a playback prediction of FIG. 6 for determining an optimal deletion time for a new recording.

Reference is now made to FIG. 7, which is a depiction of using the playback prediction of FIG. 6 for determining the optimal deletion time for a new recording. An 82 year old user, Dave 710 records a movie, "Gone With the Wind" on 11 November (figure element 720). The playback predictions of FIG. 6 can be used, therefore, in order to determine, by knowing the user group and recorded content group, the optimal deletion time for the recording 720. By performing a lookup in the matrix 660 for users over 35 years old for movies, the system determines that the deletion date of the recording 720 is to be set for recording 12.91 days after the day of recording, i.e. 11 November+12.91 days=23 November (figure element 730). Alternatively, the exemplary period of 12.91 days may be rounded up to 13 days, i.e. figure element 730 would indicate that the deletion date of the recording 720 should be 24 November.

It is appreciated that a system which implements the methods described herein does so on at least one computing device, which may comprise a distributed computing device. The at least one computing device comprises at least one processor, memory for storing data for use by the processor, and storage (which may or may not be the same storage as cloud storage device 115). The processor may comprise more than one processor. One or more of the processors may be a special purpose processor operative to perform the methods described herein above. Other hardware and software may be comprised on said at least one computing device as is known in the art.

Figure 8:
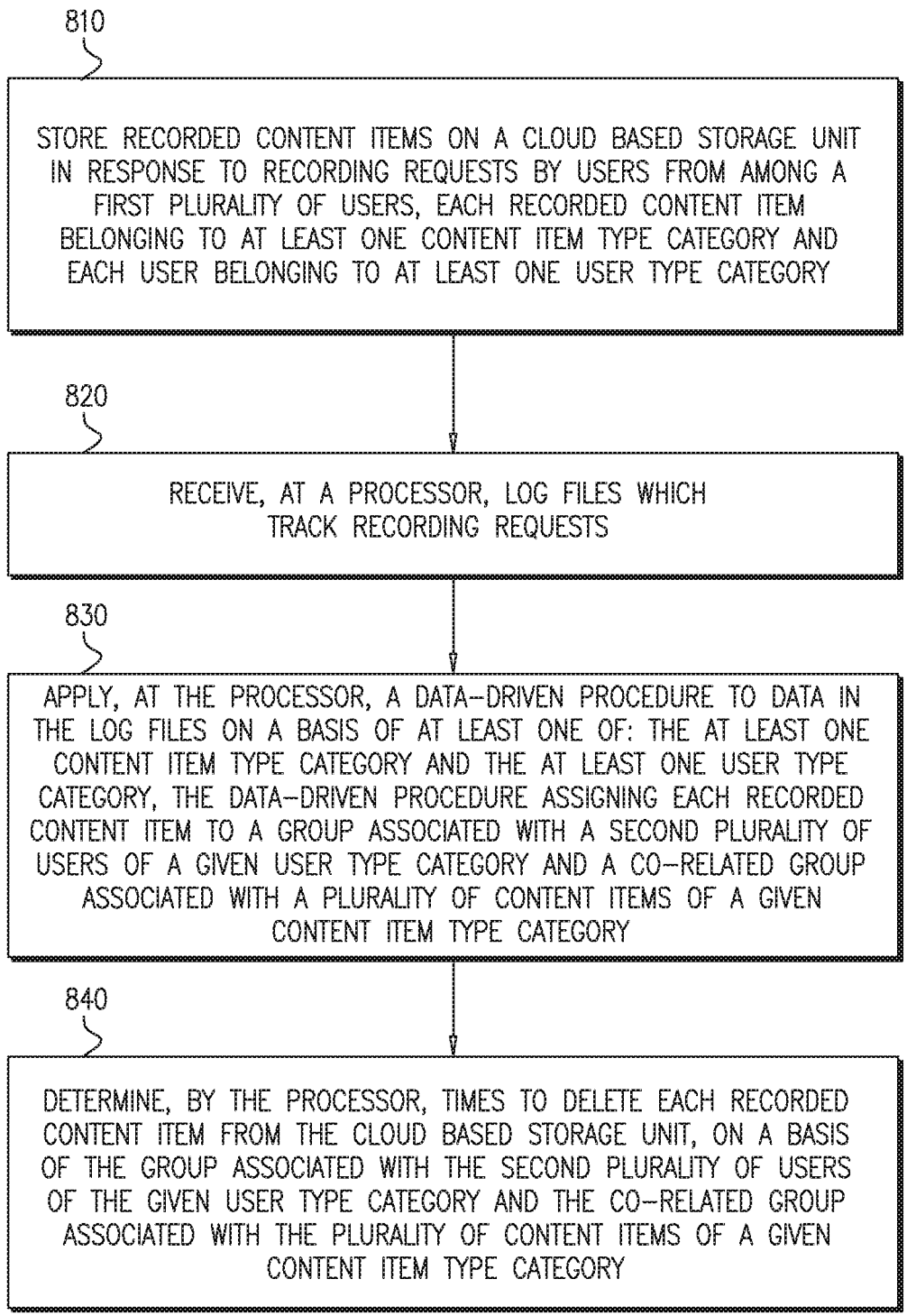
FIG. 8 is a flow chart of a method of operation for one embodiment of the present disclosure.

Reference is now made to FIG. 8, which is a flow chart of a method of operation for one embodiment of the present disclosure. At step 810 recorded content items are stored on a cloud based storage unit in response to recording requests by users from among a first plurality of users, each content item belonging to at least one content item type category and each user belonging to at least one user type category.

At step 820 log files which track recording requests are received at a processor.

At step 830 a data-driven procedure is applied to data in the log files on a basis of at least one of: the at least one content item type category; and the at least one user type category, the data-driven procedure assigning each recorded content item to a group associated with a second plurality of users of a given user type category and a co-related group associated with a plurality of content items of a given content item type category.

At step 840 the processor determines times to delete each recorded content item from the cloud based storage unit, on a basis of the group associated with the second plurality of users of the given user type category and the co-related group associated with the plurality of content items of a given content item type category.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method comprising:
    determining playback time of a recorded content item, wherein determining the playback time of the recorded content item comprises:
        assigning the recorded content item to a group associated with a plurality of users of a user type category and a co-related group associated with a plurality of content items of a content item type category based on a similarity between a user and the recorded content, and wherein assigning the recorded content item comprises:
            determining an average distance between the plurality of users and the recorded content item per group and per co-related group,
            provisionally assigning the recorded content item into each groups and each co-related groups, and
            assigning the recorded content item into the group and the co-related group having a smallest change in the average distance before and after provisional assignment, and
        determining the playback time of the recorded content item based on the group and the co-group;
    receiving cost data corresponding to a cost to store content and a cost to reconstitute content; and
    determining, based on the playback time and the cost, an optimal time to delete the recorded content item.

2. The method of claim 1, further comprising deleting the recorded content item at the determined optimal time.

3. The method of claim 1, wherein the content item type comprises content genres.

4. The method of claim 1, wherein the user type comprises user demographics.

5. The method of claim 1, wherein the recorded content item is stored on a cloud based storage unit.

6. The method of claim 5, wherein the cloud based storage unit comprises a physical storage media.

7. The method of claim 1, wherein determining the optimal time comprises applying a statistical method-based data-driven procedure.

8. The method of claim 7, wherein applying the statistical method-based data-driven procedure comprises applying a Jaccard index.

9. The method of claim 7, wherein applying the statistical method-based data-driven procedure comprises using an average last play back time of recorded content types and user types.

10. The method of claim 1, wherein determining the optimal times comprises applying a machine learning data-driven procedure.

11. The method of claim 10, wherein applying the machine learning data-driven procedure comprises applying a co-clustering machine learning procedure, where a given user type is co-clustered with a given recorded content type.

12. The method of claim 11, wherein the co-clustering machine learning procedure comprises a spectral co-clustering machine learning procedure.

13. A system comprising:
a memory storage; and
a processing unit coupled to the memory storage, wherein the processing unit is operative to:
determine a playback time of a recorded content item, wherein determining the playback time of the recorded content item comprises:
assigning the recorded content item to a group associated with a plurality of users of a user type category and a co-related group associated with a plurality of content items of a content item type category based on a similarity between a user and the recorded content, and wherein assigning the recorded content item comprises:
determining an average distance between the plurality of users and the recorded content item per group and per co-related group,
provisionally assigning the recorded content item into each groups and each co-related groups, and
assigning the recorded content item into the group and the co-related group having a smallest change in the average distance before and after provisional assignment, and
determining the playback time of the recorded content item based on the group and the co-group;
receive cost data corresponding to a cost to store the recorded content item and a cost to reconstitute the recorded content item; and
determine, based on the playback time and the cost data, an optimal time to delete recorded content item.

14. The system of claim 13, wherein the processing unit is further operative to delete the recorded content item at the determined optimal time.

15. The system of claim 13, wherein the content type comprises content genres.

16. The system of claim 13, wherein the user type comprises user demographics.

17. A non-transitory computer-readable medium that stores a set of instructions which when executed perform a method executed by the set of instructions comprising:
determining a playback time of a recorded content item, wherein determining the playback time of the recorded content item comprises:
assigning the recorded content item to a group associated with a plurality of users of a user type category and a co-related group associated with a plurality of content items of a content item type category based on a similarity between a user and the recorded content, and wherein assigning the recorded content item comprises:
determining an average distance between the plurality of users and the recorded content item per group and per co-related group,
provisionally assigning the recorded content item into each groups and each co-related groups, and
assigning the recorded content item into the group and the co-related group having a smallest change in the average distance before and after provisional assignment, and
determining the playback time of the recorded content item based on the group and the co-group;
receiving cost data corresponding to a cost to store the recorded content item and a cost to reconstitute the recorded content item; and
determining, based on the playback time and the cost data, an optimal time to delete the recorded content item.

18. The non-transitory computer-readable medium of claim 17, wherein determining the optimal time comprises applying a machine learning data-driven procedure.

19. The non-transitory computer-readable medium of claim 18, wherein applying the machine learning data-driven procedure comprises applying a co-clustering machine learning procedure, where a given user type is co-clustered with a given recorded content type.

20. The non-transitory computer-readable medium of claim 19, wherein the co-clustering machine learning procedure comprises a spectral co-clustering machine learning procedure.

* * * * *